United States Patent
Yokoyama et al.

[11] Patent Number: 5,610,956
[45] Date of Patent: Mar. 11, 1997

[54] FAST REACTOR CORE

[75] Inventors: Tsugio Yokoyama, Yokohama; Takeshi Shimizu, Kisarazu, both of Japan

[73] Assignee: Kabushiki Kaisha Toshiba, Kawasaki, Japan

[21] Appl. No.: 302,414

[22] Filed: Sep. 8, 1994

[30] Foreign Application Priority Data

Sep. 8, 1993 [JP] Japan .................................... 5-222932

[51] Int. Cl.⁶ ............................................. G21C 7/00
[52] U.S. Cl. ..................... 376/172; 376/327; 376/331; 376/351
[58] Field of Search ..................... 376/172, 173, 376/327, 333, 329, 331, 336, 337, 351

[56] References Cited

U.S. PATENT DOCUMENTS

| | | | |
|---|---|---|---|
| 3,409,503 | 11/1968 | Swanson | 376/172 |
| 3,510,399 | 5/1970 | Terasawa et al. | 376/328 |
| 3,640,845 | 2/1972 | Ripley | 376/327 |
| 3,702,282 | 11/1972 | Gatley et al. | 376/172 |
| 4,655,989 | 4/1987 | Kawashima et al. | 376/333 |
| 4,762,672 | 8/1988 | Kurihara et al. | 376/333 |

FOREIGN PATENT DOCUMENTS

| | | | |
|---|---|---|---|
| 2261991 | 11/1987 | Japan | 376/331 |
| 1132472 | 11/1968 | United Kingdom | 376/331 |

*Primary Examiner*—Harvey E. Behrend
*Attorney, Agent, or Firm*—Foley & Lardner

[57] ABSTRACT

A fast reactor core in which a coolant flows comprises a plurality of fuel assemblies each loaded with a fissionable material and a plurality of gas sealed assemblies disposed between the fuel assemblies and sealed with a gas, wherein a surface level of the coolant in the gas sealed assembly changes from an axially upper portion including a core top level to an axially lower portion at a time of core power increase or a core coolant flow quantity decrease. Each of the gas sealed assemblies includes an inner cylindrical member for reducing a horizontal cross sectional area of the flow of the coolant at a portion in height corresponding to an axial central portion of the core and the cylindrical member includes a member for generating heat by radiation.

13 Claims, 6 Drawing Sheets

FAST REACTOR CORE

BACKGROUND OF THE INVENTION

1. Field of The Invention

The present invention relates to a liquid metal cooling type fast reactor and more particularly to a fast reactor core having an improved structure or arrangement of core constituting elements.

2. Related Prior Art

A fast reactor core is generally composed of a number of fuel assemblies each loaded with fissionable or fissile material and utilizes liquid sodium (Na) as a coolant for removing heat from the fuel.

In a usual and steady operation of the fast reactor, although temperatures of respective portions of the fast reactor core do not abnormally rise, the core is designed on an assumption of an accident so that the core can be safely shut down even in a case where the temperature rises over predetermined values.

For example, in a case where the sodium in the fuel assembly is heated to a high temperature and the density thereof is lowered and, in a the case of a small-sized core, since a large number of neutrons leak from the core, a negative reactivity is inserted to thereby safely shutdown the core. However, in a case of the large-sized core, a reduced amount of the neutrons leaks from the core and the reactivity is made positive when the sodium in the fuel assembly is highly heated. In such case, it is required to analyze, in detail, in consideration of the other factors of the reactivity, whether or not the core can be shutdown. Accordingly, it is extremely worthwhile for a safety design of the core to make negative the reactivity effect, that is, the temperature coefficient of the coolant due to the temperature increase of the sodium.

However, in general, it is not desired in a power generation plant to extremely reduce the output power of a core from a viewpoint of power generation cost. In the meantime, in a conventional design of the core, in order to make the core reactivity negative in the case of sodium temperature increase, it has been required to make the core power less than about 100 MWe. However, this causes a problem that the temperature coefficient of the coolant becomes positive when the core is designed for the large power generation. That is, the design of the core for the large power generation renders the size of the core large. In a case where the density of the coolant is reduced by increasing the temperature thereof, the temperature coefficient (reactivity) of the coolant is decided by the interrelationship between the positive reactivity effect induced by the decreasing of neutron slowing down, the increase in the neutron generation number in the plutonium fuel, and the negative reactivity effect induced by the enhanced leakage of the neutrons from the core. For a large reactor core, the latter-mentioned effect is very small near the central portion of the core because of less leakage of the neutrons. Due to this the reactivity is made positive in the vicinity of the central portion of the core, so the reactivity is made positive in the entire core even if the temperature of the core is uniformly increased.

As a main reason for the abnormal increase of the temperature of the coolant in the core, there are considered a power increase (power increasing type phenomenon) due to a positive reactivity insertion and a coolant flow rate reduction (flow loss type phenomenon) due to a pump operation stop. Accordingly, at the time of the flow loss type phenomenon, the pressure of the coolant is simultaneously reduced in accordance with the reduction of the flow rate, but in a prior art technology, there has not been provided a positive and appropriate countermeasure to such phenomenon or accident.

SUMMARY OF THE INVENTION

An object of the present invention is to substantially eliminate defects or drawbacks encountered in the prior art described above and to provide a fast reactor core capable of causing a large negative in response reactivity to a power increasing type phenomenon or coolant flow loss type phenomenon in the core.

This and other objects can be achieved according to the present invention by providing a fast reactor core in which a coolant flows comprising a plurality of fuel assemblies each loaded with a fissionable material and a plurality of gas sealed assemblies disposed between the fuel assemblies and sealed with a gas, in which a surface level of the coolant in the core changes from an axially upper portion including a core top level to an axially lower portion at a time of a core power increase or a core coolant flow quantity decrease.

In preferred embodiments, each of the gas sealed assemblies includes an inner cylindrical member for reducing a horizontal cross sectional area of the coolant at a portion in height corresponding to an axial central portion of the core, the cylindrical member including a member for generating heat by radiation. The gas sealed assemblies can be arranged successively in the circumferential direction in the core or arranged adjacent to control rods in the core.

Each of the gas sealed assemblies comprises an outer sheath to be disposed in the core in a vertical fashion and filled with a sealing gas, a heat generating member disposed inside the outer sheath, an inner boundary member continuous to the heat generating member having a diameter smaller than that of the heat generating member at a portion in height corresponding to an axial central portion of the core, a neutron absorber disposed at an inner lower portion of the outer sheath, and a coolant flow-in hole formed in the outer sheath through which a coolant flows inside the outer sheath.

A first gas plenum is formed in a portion between the outer sheath and the inner boundary portion and a second gas plenum is formed in an inner top portion of the outer sheath, the first and second gas plenums being communicated with each other through a gas communicating portion. The heat generating member is formed of a material generating heat by absorption of neutrons.

In a detailed aspect, there is provided a fast reactor core in which a coolant flows comprising:

a plurality of fuel assemblies each loaded with a fissionable material;

a plurality of gas sealed assemblies disposed between the fuel assemblies and sealed with a gas, in which a surface level of the coolant in the core changes from an axially upper portion including a core top level to an axially lower portion at a time of a core power increase and a core coolant flow quantity decrease;

a plurality of blanket assemblies disposed so as to surround the fuel assemblies and the gas sealed assemblies;

a plurality of neutron shielding members disposed so as to surround the blanket assemblies; and control rods each disposed between the fuel assemblies or the gas sealed assemblies.

According to the present invention of the characters or structures described above, in the case of the power increasing type phenomenon, the number of the neutrons in the core increases and the radiation quantity is hence increased. As a result, the heat generating amount of the cylindrical heat generating member increases and the coolant inside the core is boiled. Accordingly, the coolant level is lowered from the core top level, providing an upper space. In a case where the power is not increased until the coolant is boiled, after a long time period, the sealing gas is thermally swelled by the increasing of the temperature inside the gas sealed assembly and the coolant level is lowered from the core top level, thus also providing an upper space. As a result, the neutrons generated in the fuel assembly mainly leak upward in the core from the gas sealed assembly, thus providing the negative reactivity.

In the case of the coolant flow loss type phenomenon, the pressure of the coolant in the gas sealed assembly is lowered by, for example, coolant flow rate lowering caused by, for example, pump operation stop, and the coolant pressure is made lower than the sealing gas pressure, thus the coolant level in the gas sealed assembly being largely lowered. Accordingly, in this case, the negative reactivity is also inserted.

As described above according to the present invention, the negative reactivity insertion quantity in event of an accident of the fast reactor core can be significantly increased in comparison with the core including no gas sealed assembly, thus remarkably improving the operational safety and reliability.

DESCRIPTION OF THE PREFERRED EMBODIMENTS

Figure 1:
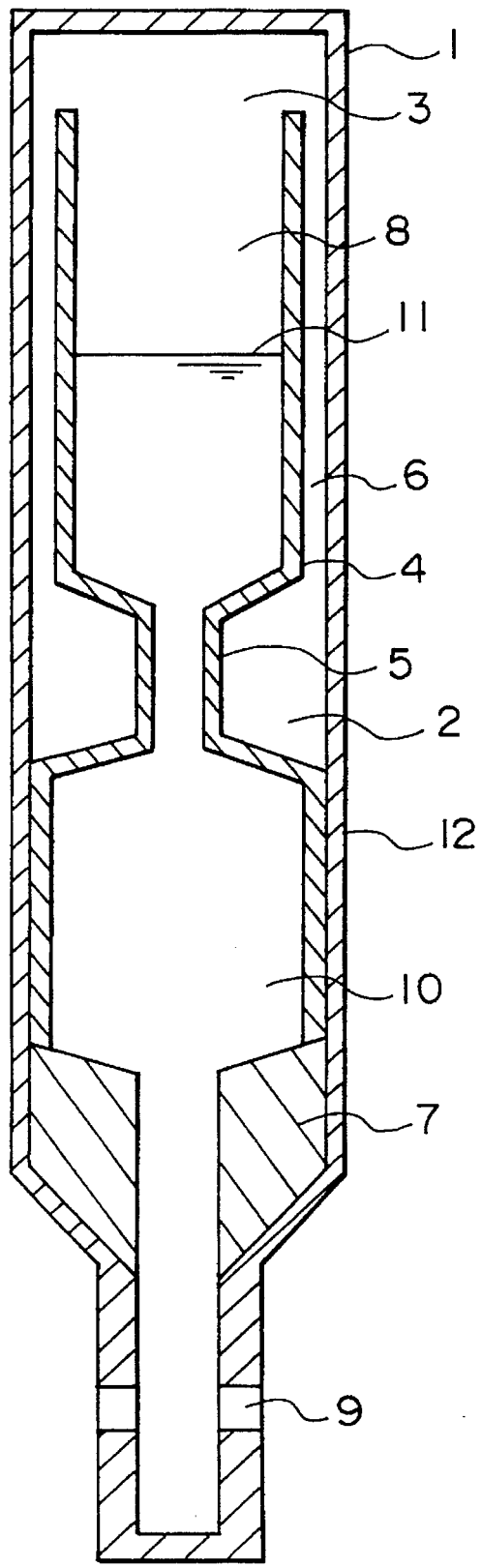
FIG. 1 is an elevational section of a gas-sealed assembly utilized for a fast reactor core according to one embodiment of the present invention.
Figure 2:
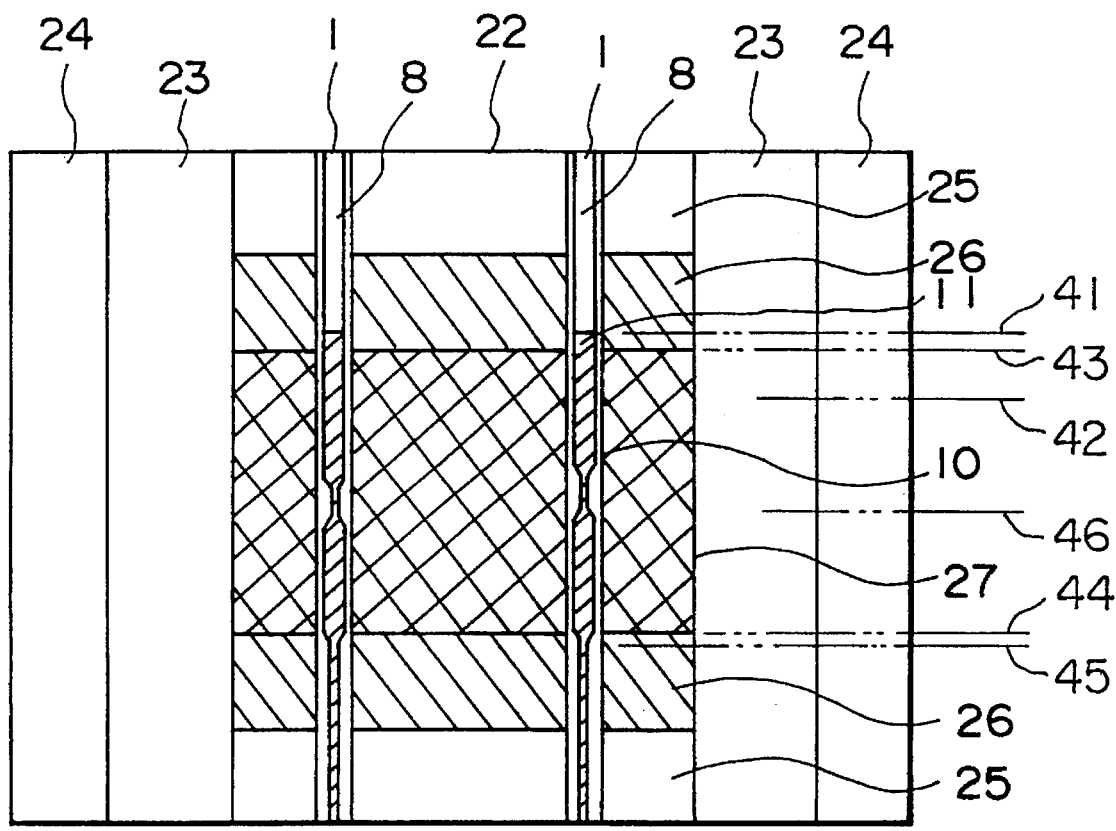
FIG. 2 is an elevational section of a fast reactor core in which a plurality of gas-sealed assemblies of the type shown in FIG. 1 are loaded.
Figure 3:
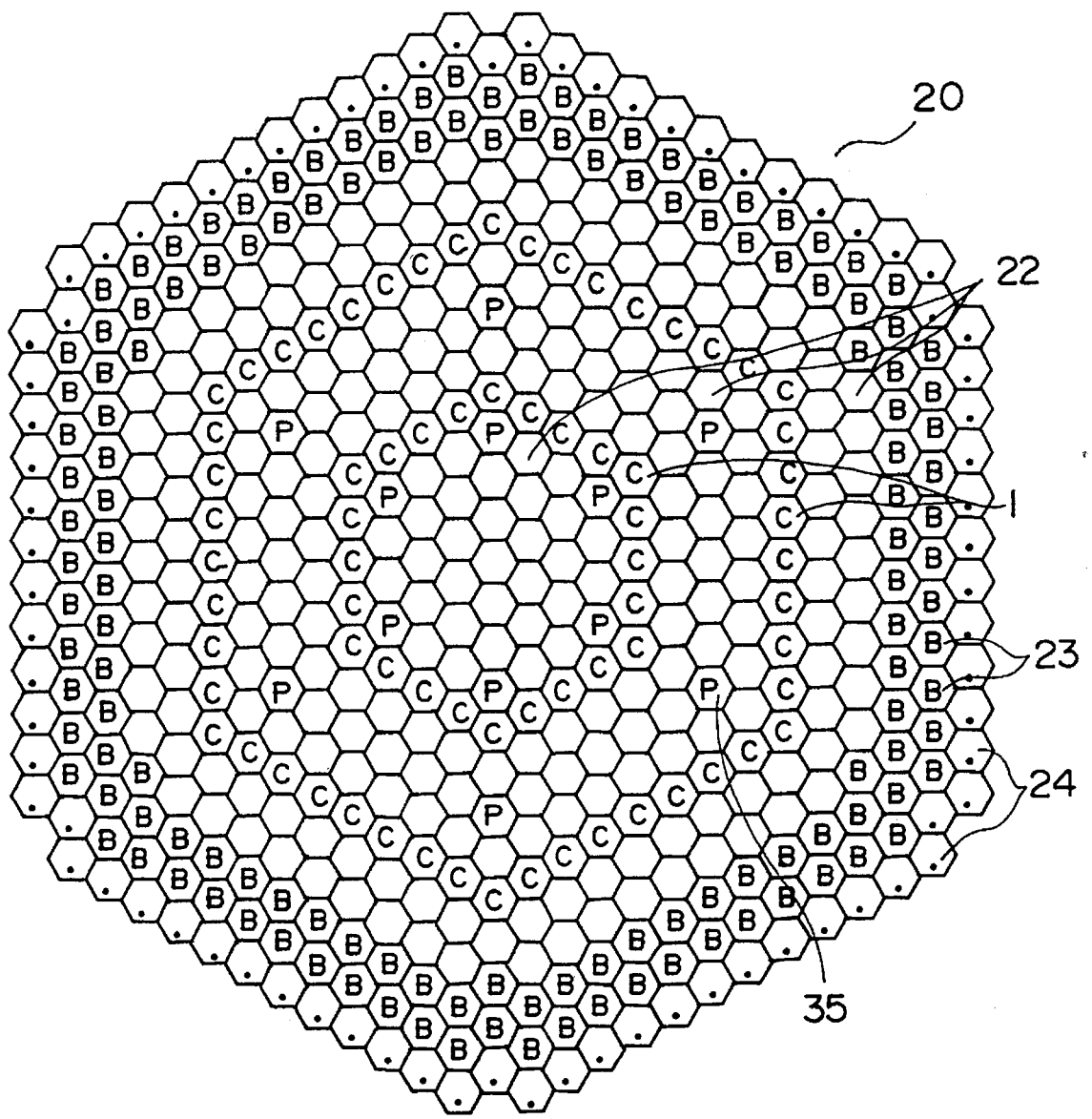
FIG. 3 is a plan view of the fast reactor core shown in FIG. 2.

With reference to FIGS. 1–3, a first embodiment of the present invention will be described hereunder.

Gas sealed assemblies 1 (C-type in FIG. 3) of FIG. 1 are disposed between a plurality of fuel assemblies 22 each of which contains a fissionable material at a core portion 27 and axial blanket portions 26, 26 formed of a parent material and gas plenum portions 25, 25 accumulated with a fission gas, both being arranged on axial both sides of the core portion 27 as shown in FIGS. 2 and 3. A core 20 of a fast reactor according to the present invention is composed of these assemblies 1 and 22, blanket assemblies 23 (B-type in FIG. 3) and neutron shielding members 24 (·-type in FIG. 3) surrounding the assemblies 1, 22 and 23. Control rods (P in FIG. 3) are disposed in the core 20 with spaces with each other.

As shown in FIG. 1, the gas sealed assembly 1 comprises an outer sheath 12 and a heat generating member 4, a sealing gas 8 and an inner coolant 10 are disposed in the outer sheath 12. Coolant flow-in holes 9 are formed to the lower, as viewed in FIG. 1, portion of the outer sheath 12. As the sealed gas 8, an inert gas such as argon gas usually utilized as a cover gas inside a reactor vessel of a fast reactor will be preferably used in consideration of a reaction with the coolant.

The quantity of the coolant to be flowed into the gas sealed assembly 1 through the holes 9 and the inner shape of the gas sealed assembly 1 are determined so that the liquid surface level 11 of the coolant in the sheath 12 is higher than the top level of the core in a steady operation condition by the pressure of the coolant flowed therein through the holes 9, and the liquid level 11 is lower than the top level of the core at the time of power increasing type phenomenon or flow loss type phenomenon by the volume increasing due to the temperature increasing of the sealed gas or pressure lowering of the flow-in coolant.

In general, the neutron flux is made high at the core portion in the axial arrangement, and accordingly, the heat generating member 4 is arranged so that the core position accords with the center of the heat generation in the axial direction to thereby increase the quantity of the heat generated at a power increase time. It is effective to form such heat generating member 4 with a material, such as hafnium, which generates heat by neutron absorption, but other material such as gamma ($\gamma$) heat generating material, tantalum or stainless material may be utilized.

As shown in FIG. 1, the heat generating member 4 is fixedly arranged within the sheath 12 and at the upper position of a neutron absorber 7, and provided with an inner boundary portion 5 reduced in its diameter hence to reduce the cross sectional area of the coolant at a portion near the axially central level, that is, the inner boundary portion 5 is located to a portion near the axially central portion of the gas sealed assembly and the inner boundary portion 5 gives reduced cross sectional area of the coolant 10 at a portion in the vicinity of the core in comparison with core mid-plane upper and lower portions. According to the arrangement described above, in an arrangement in which the gas sealed assemblies of the present embodiment are disposed in the core in the diameter direction thereof, the positive void reactivity effect due to the reduction of the neutron slowing effect at a portion in the vicinity of the core central portion is suppressed and, on the contrary, the negative reactivity effect due to the neutron leakage in the axial direction is not largely changed. Accordingly, as a whole, the negative reactivity effect is increased.

A core height portion gas plenum 2 is arranged between the outer sheath 12 and the heat generating member 4 at a portion near the core height level portion of the outer sheath 12. The core height portion gas plenum 2 is communicated with a top portion gas plenum 3 contacting the liquid level 11 at a steady operation period through a gas communicating portion 6. Further, the neutron absorber 7 formed of hafnium or the like is arranged at a portion lower than the lower end level of the core in a lower portion of the gas sealed fuel assembly.

Figure 4:
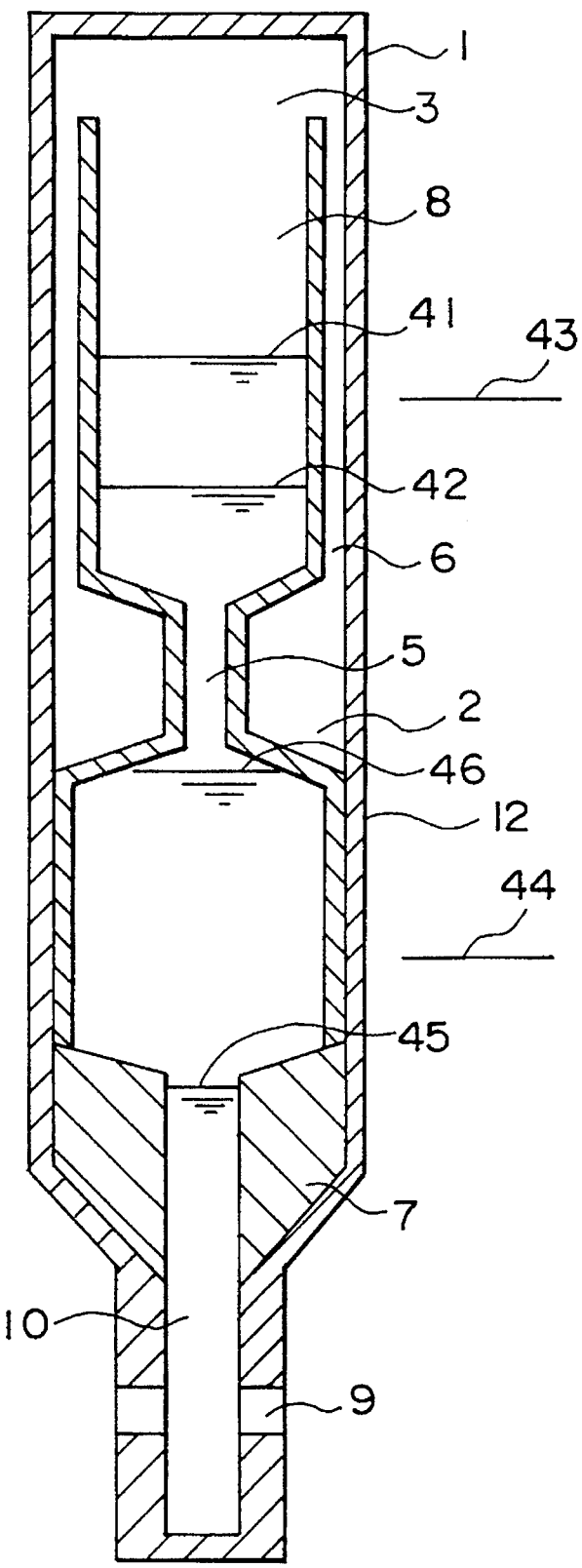
FIG. 4 is an elevational section of the fuel assembly shown in FIG. 1 for explaining the operation thereof.

In the above arrangement, in the case of the power increasing-type phenomenon, the neutron flux and the gamma ($\gamma$)-ray flux are first increased at the core portion. Then, the generated heat quantity of the heat generating material 4 is accordingly increased and the temperature of the inner coolant 10 is hence increased and boiled, resulting in sodium vapor filling the top gas plenum 3. As a result, as shown in FIGS. 2 and 4, the liquid level of the coolant is lowered from the steady level 41 to the power increasing level 46, and in a case where the power is not increased till the coolant is boiled, the liquid level is lowered from the steady level 41 to the level 42 in the event of an accident below the core height upper end level 43. Accordingly, the neutrons from the core fuel portion, i.e. core portion 27 in FIG. 2, leak axially upwards through the sealed gas area and the negative reactivity is hence caused at the core, thus the power of the core being lowered and the power increasing type phenomenon being converged.

On the other hand, in the case of the flow loss type phenomenon, the liquid level is lowered to the flow loss type accident level 45 below the core height lower end level 44, as shown in FIGS. 2 and 4, due to the lowering of the pressure of the coolant 10 inside the gas sealed assembly 1 communicated with the coolant flow-in hole 9. Accordingly, neutrons reflected by the upper and lower inner coolant 10 in the core steady operation period likely leak from the core fuel portion in the axial direction through the sealed gas area, thus causing the negative reactivity. As a result, the power of the core is reduced and the flow loss type phenomenon is converged.

At this operation period, as described before, at the core central level, the positive reactivity is caused by the void of the same quantity of the sodium (Na), so that the inner boundary portion 5 is designed to reduce the inner coolant ratio in the area causing the positive reactivity to thereby reduce the sodium quantity, whereby the reactivity effect can be made large in the negative value.

Furthermore, the negative reactivity can be made large by the arrangement of the neutron absorber 7 at the lower portion of the gas sealed assembly 1 to distort the neutron flux in the axial direction and cause the neutron to likely leak in the axial direction much in quantity.

The negative reactivity can be made large, with no specific limitation, by setting the quantity of the gas to be sealed and constructing the inner structure of the gas sealed assembly so that the liquid level height of the inner coolant 10 is set above the upper axial blanket portion at the steady operation period and possibly below at an accident and that the inner boundary 5 and the lower neutron absorber 7 are arranged so as to suppress the positive reactivity and increase the neutron leakage effect. For example, the level change can be made large, even with the same pressure change, by increasing the quantity of an initial seal gas or making the top gas plenum portion large. Further, since the neutron absorber 7 has an effect for suppressing streaming of the neutron as well as the neutron absorbing effect, it may be better to arrange the absorber 7 so that the top portion thereof does not appear above the sealed gas layer in an accident.

Figure 5:
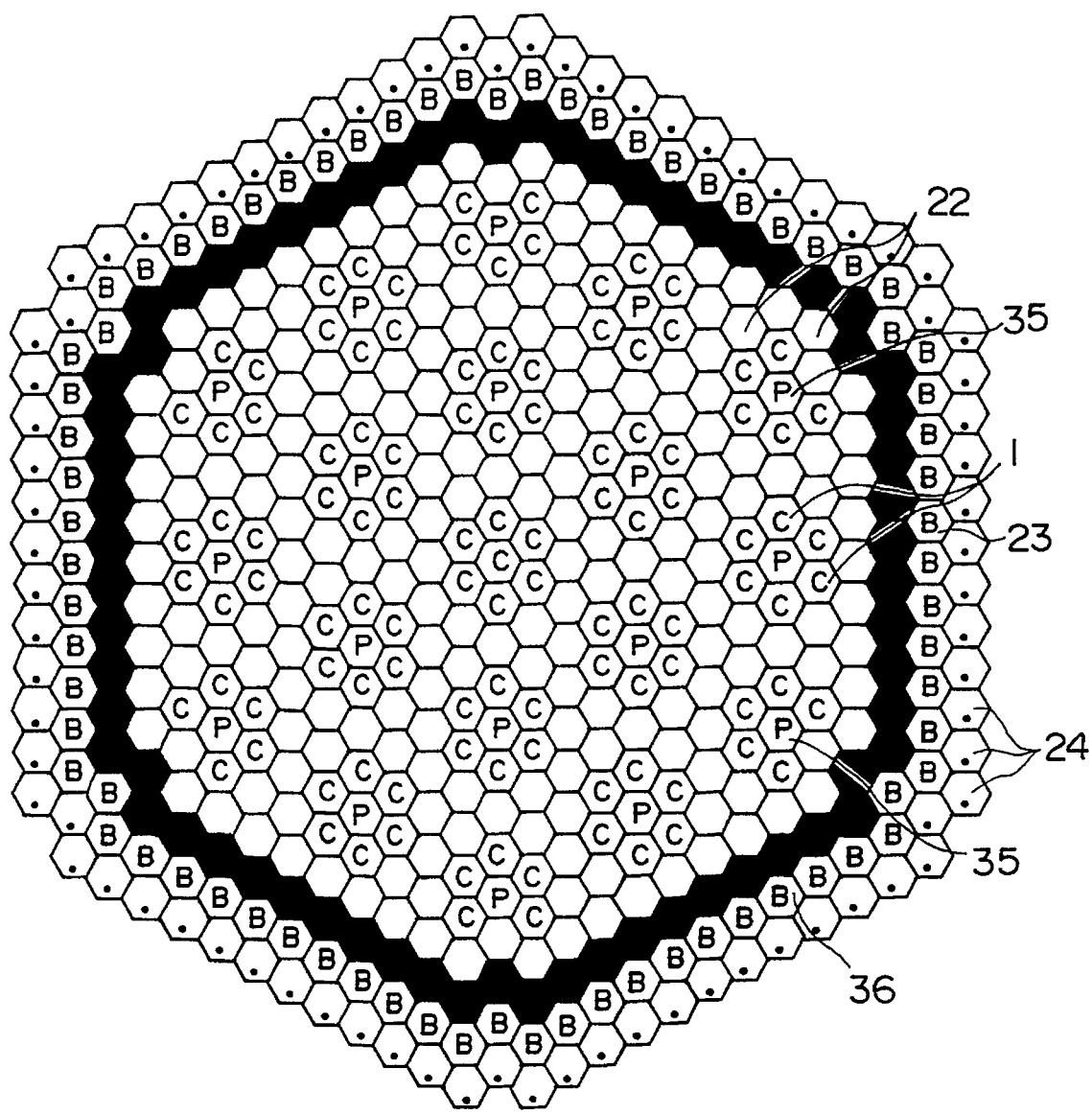
FIG. 5 is a plan view of a fast reactor core according to another embodiment of the present invention.
Figure 6:
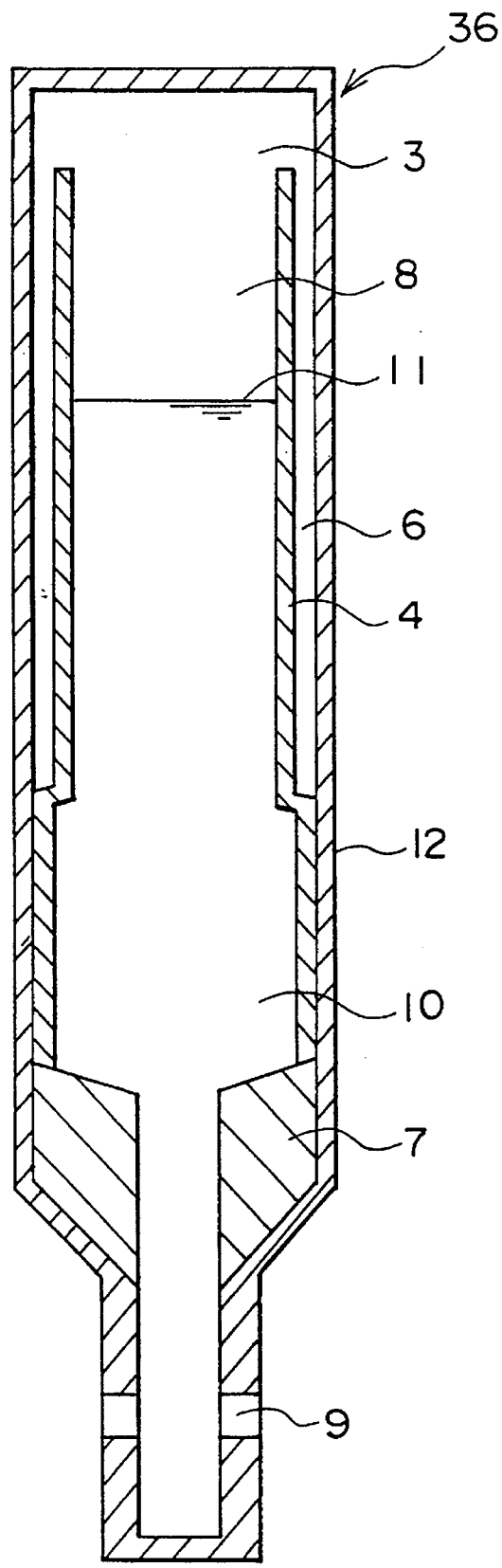
FIG. 6 is an elevational section of a gas-sealed assembly of a further structure according to the present invention.

According to the present invention, the arrangement and the inner structure of the gas sealed assembly are not limited to the described embodiment and many other changes or modifications may be adapted. For example, there may be adapted the arrangement of the gas sealed assembly in which the negative reactivity is realized at the accident, and it is only required for the gas sealed assembly to have the shape and structure to satisfy the operation and function described above with reference to the preferred embodiment so that the sealed gas does not leak through the coolant flow-in hole. For example, as shown in FIG. 5, the gas sealed assemblies 1 (C in FIG. 5) may be arranged around the control rods 35 (P in FIG. 5) for the reason that the control rod absorber has a neutron absorbing effect making large a peripheral neutron gradient and hence making large the neutron leakage effect. Furthermore, as shown in FIG. 6, in a core peripheral portion including no positive reactivity area, the gas sealed assembly may be provided with the inner boundary providing an axially linear shape (black color in FIG. 5) to enlarge the coolant cross section. Still furthermore, the gas communicating portion 6 may be preferably constructed so as to provide a cylindrical shape for effectively performing the removal of the inner coolant temperature from the outside of the gas sealed assembly 1 so as to prevent the temperature of the coolant 10 inside the gas sealed assembly 1 from abnormally increasing at the steady operation period of the reactor. There may be arranged a fin means which is disposed on the surface of the heat generating member 4 and connected to a metallic portion for promoting the temperature increasing of the sealed gas. The core height portion gas plenum may be entirely substituted with the heat generating member or a weight may be arranged for preventing the floating of the gas sealed assembly 1 by the pressure of the coolant. Furthermore, a tag gas, usually utilized for detecting a breakage of a fuel pin for the detection of the leakage of the sealed gas due to the breakage of the gas sealed assembly, may be sealed in the gas sealed assembly.

As described above according to the present embodiment and the modifications thereof, the negative reactivity insertion quantity at the accident of the fast reactor core can be significantly increased in comparison with the core including no gas sealed assembly, thus remarkably improving the operational safety and reliability.

What is claimed is:

1. A fast reactor core, comprising:

a plurality of fuel assemblies each loaded with a fissionable material; and a plurality of gas sealed assemblies disposed between the fuel assemblies, each gas sealed assembly including an outer sheath forming a gas plenum containing a sealing gas at a top portion of the outer sheath and having coolant flow-in holes at a bottom portion of the outer sheath;

an inner cylindrical member located in the outer sheath, a bottom portion of the inner cylindrical member contacting an inner wall of the outer sheath and a top portion of the inner cylindrical member spaced from the inner wall of the outer sheath to form a gas space containing sealing gas between the top portion of the inner cylindrical member and the inner wall of the outer sheath;

the inner cylindrical member containing sealing gas and coolant;

the sealing gas in the inner cylindrical member being in communication with the sealing gas in the gas plenum, which is in communication with the sealing gas in the gas space;

the coolant in the inner cylindrical member being in communication with coolant outside of the gas sealed assembly via the flow-in holes, the level of coolant in the inner cylindrical member varying depending on pressure of the sealing gas in the inner cylindrical member and pressure at the flow-in holes.

2. A fast reactor core according to claim 1, wherein the inner cylindrical member reduces a horizontal cross sectional area of the coolant in the inner cylindrical member at a portion in height corresponding to an axial central portion of the core, and wherein said inner cylindrical member includes a member for generating heat by radiation.

3. A fast reactor core according to claim 1, wherein said gas sealed assemblies are arranged successively in the circumferential direction in the core.

4. A fast reactor core according to claim 1, wherein said gas sealed assemblies are arranged adjacent to control rods in the core.

5. A fast reactor core according to claim wherein each of said gas sealed assemblies further comprises:

a heat generating member disposed inside the outer sheath to heat the sealing gas, and a neutron absorber disposed at an inner lower portion of the outer sheath.

6. A fast reactor core according to claim 5, further comprising:

a second gas plenum formed between the inner cylindrical member and the inner wall of the outer sheath, said second gas plenum being in communication with the gas space.

7. A fast reactor core according to claim 1, wherein said gas space has a cylindrical shape.

8. A fast reactor core according to claim 5, wherein said heat generating member is formed of a material generating heat by absorption of neutrons.

9. A fast reactor core according to claim 8, wherein said heat generating member is formed of hafnium.

10. A fast reactor core according to claim 1, wherein said sealing gas is an inert gas.

11. A fast reactor core according to claim 1, further comprising:

a plurality of blanket assemblies disposed so as to surround said fuel assemblies and said gas sealed assemblies;

a plurality of neutron shielding members disposed so as to surround said blanket assemblies; and control rods each disposed between said fuel assemblies or said gas sealed assemblies.

12. The fast reactor core according to claim 1, further comprising an inner boundary portion located close to the axially central portion of the gas sealed assembly and at a height corresponding to an axial central portion of the core to reduce the horizontal cross sectional area of coolant in the inner cylindrical member.

13. The fast reactor core according to claim 1, wherein said inner cylindrical member includes a heat generating member for generating heat to heat the sealing gas by radiation.

* * * * *